United States Patent [19]

Haynes

[11] 3,946,051

[45] Mar. 23, 1976

[54] AZIDOFORMATES AND THEIR USE

[75] Inventor: James N. Haynes, Wilmington, Del.

[73] Assignee: Hercules Incorporated, Wilmington, Del.

[22] Filed: Apr. 30, 1975

[21] Appl. No.: 572,973

Related U.S. Application Data

[60] Division of Ser. No. 549,229, Feb. 12, 1975, Pat. No. 3,914,262, which is a division of Ser. No. 425,906, Dec. 18, 1973, Pat. No. 3,900,683, which is a division of Ser. No. 231,741, March 3, 1972, Pat. No. 3,814,657, which is a division of Ser. No. 93,399, Nov. 27, 1970, Pat. No. 3,686,231, and a continuation-in-part of Ser. No. 887,382, Dec. 22, 1969, abandoned.

[52] U.S. Cl. .................................. 260/349; 156/326
[51] Int. Cl.² ........................................ C07C 117/00
[58] Field of Search ..................................... 260/349

[56]         References Cited
             UNITED STATES PATENTS 3,284,421   11/1966   Breslow ........................... 260/80.77
3,594,267   7/1971    Breslow ........................... 161/231
3,657,047   4/1972    Breslow ........................... 156/322
3,676,466   6/1972    Spurlin ............................ 260/349
3,754,973   8/1973    Spurlin ......................... 117/138.8 F Primary Examiner—George F. Lesmes
Assistant Examiner—William R. Dixon, Jr.
Attorney, Agent, or Firm—Marion C. Staves

[57]          ABSTRACT

Disclosed is a process of improving the adhesion of polyester material to various other materials using the azidoformates of omega-hydroxyalkyl phthalates, their related low molecular weight condensation polymers and their mixtures represented by the general formula

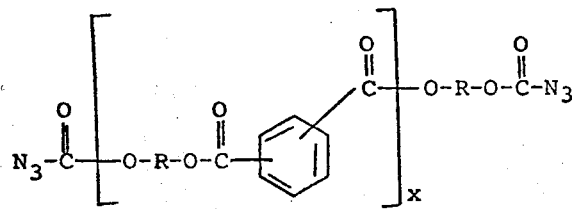

where R is an alkylene radical containing 2 to 10 carbon atoms and x is an integer of from about 1 to about 10. In particular, there is disclosed a process of improving the adhesion of polyester tire cord to rubber tire stock using the said azidoformate compounds.

2 Claims, No Drawings

AZIDOFORMATES AND THEIR USE

This application is a division of my copending application Ser. No. 549,229, filed Feb. 12, 1975, now U.S. Pat. No. 3,914,262, which application is a division of copending application Ser. No. 425,906, filed Dec. 18, 1973, now U.S. Pat. No. 3,900,683, which application is a division of copending application Ser No. 231,741, filed Mar. 3, 1972, now U.S. Pat. No. 3,814,657, which application is a division of application Ser. No. 93,399, now U.S. Pat. No. 3,686,231, which application is a continuation-in-part of application Ser. No. 887,382, filed Dec. 22, 1969, now abandoned.

This invention relates to a new class of organic compounds and to certain uses for the new compounds. In particular this invention relates to the azidoformates of omega-hydroxyalkyl phthalates and their related low molecular weight condensation polymers and their mixtures, their use in modifying polyester material to provide improved adhesion and to the products so produced.

Attempts have been made in the past to adhere polyester material to other materials such as other polymers, resins, silicious materials, metals, metal oxides, wood, paper, cloth, etc. However, such attempts have been only partially successful because the said materials do not adhere well to polyesters.

It has now been found that the adhesion of polyester materials, i.e., polyesters obtained by reacting glycols with dicarboxylic acids, can be greatly improved by modifying the surface of said polyester material with an omega-hydroxyalkyl phthalate azidoformate.

The novel and unique omega-hydroxyalkyl phthalate azidoformates of this invention are represented by the general formula

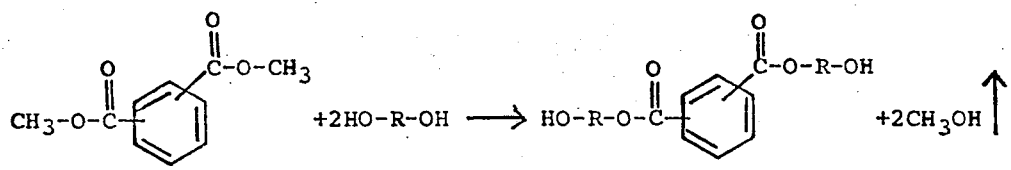

where R is an alkylene radical containing 2 to 10 carbon atoms and $x$ is an integer of from about 1 to 10. It is to be understood that the term "omega-hydroxyalkyl phthalate azidoformates" as used in the specification and claims of this application includes not only the pure compounds, but mixtures of the o-, m- and p-substituted phthalates and their reduced low molecular weight condensation polymers as well as mixtures thereof. The azidoformate compounds of this invention range from liquids to solids at room temperature and atmospheric pressure and have characteristic infrared spectra, containing a strong azide band at about 2140 cm.$^{-1}$, and a strong carbonyl band at around 1740 cm.$^{-1}$.

The omega-hydroxyalkyl phthalate azidoformates of this invention can be prepared by various methods. For example, they can be prepared from the corresponding hydroxyl terminated low molecular weight condensation products of a glycol and either o-, m-, or p-phthalic acid or a mixed phthalic acid. The hydroxyl terminated compounds can be prepared by a transesterification reaction using a dimethyl ester of a phthalic acid and a glycol. As indicated above, the ester of phthalic acid can be a pure o-, m- or p-isomer, but more likely will be an ester of mixed isomers. Various straight chain glycols containing 2 to 10 carbon atoms, such as ethylene glycol, propylene glycol, butylene glycol, hexylene glycol, octylene glycol and nonene glycol can be used. The transesterification reaction between the dimethyl ester of a phthalic acid and a glycol can be shown in the following general equation:

where R is as defined above. As the transesterification reaction progresses the amount of free alkylene glycol diminishes and the amount of diglycol phthalate increases, giving rise to the possibility of low molecular weight condensation polymers and their mixtures Thus, the above general equations can be modified as follows:

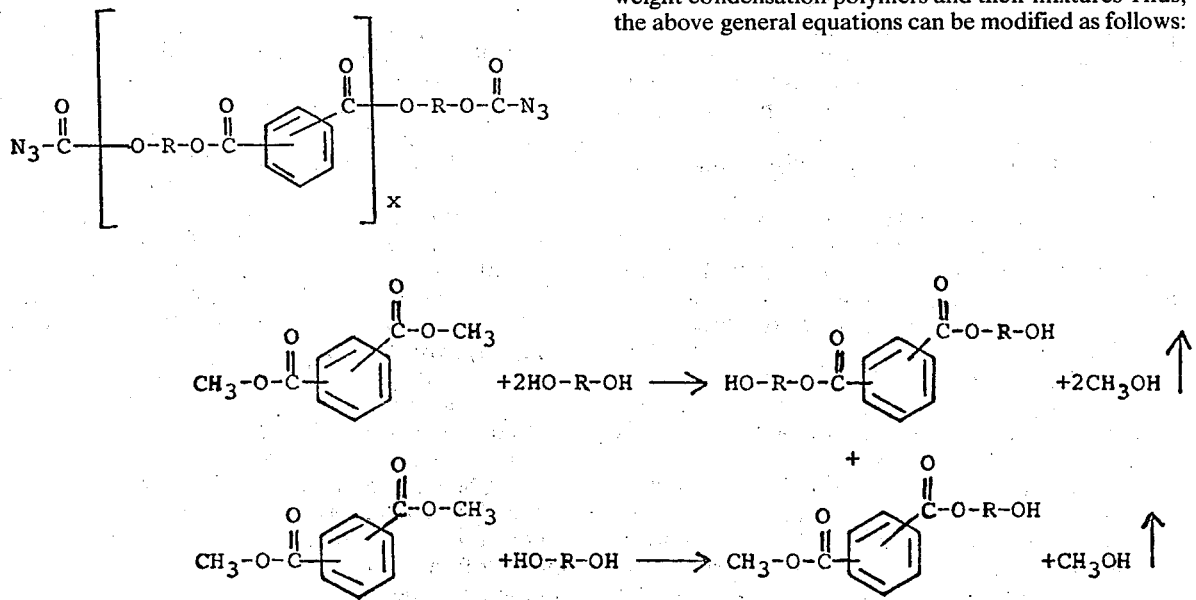

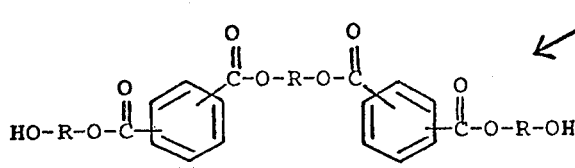

where R is as defined above. It will be apparent to those skilled in the art that the transesterification reaction will give rise to still higher molecular weight condensation products and usually will result in a mixed product. While it is quite possible to obtain a product 80 or even 90% pure, it is very difficult to obtain a completely pure product. The product or products of the transesterification reaction can be treated with phosgene to produce the corresponding chloroformate or chloroformates. The reaction can be shown as follows:

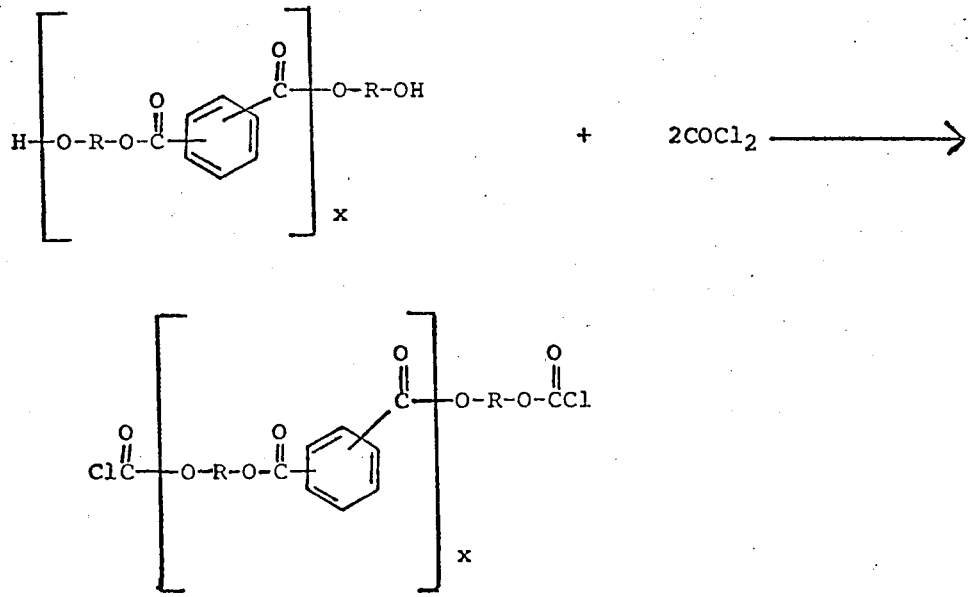

where R and $x$ are as defined above. The resulting chloroformate is then treated with an excess of sodium azide to form the azidoformate groups. The reaction of the hydroxy terminated compound with phosgene is usually carried out at a temperature of from about 0°C. to about 20°C. in an inert solvent such as methylene chloride, ethylene dichloride, toluene or xylene. The reaction with sodium azide is generally conducted at a temperature of about 25° to about 35°C. in a mixed solvent such as acetone-water, methylene chloride-acetone-water, or benzene-acetone-water.

As indicated above, this invention includes the use of the unique omega-hydroxyalkyl phthalate azidoformates in modifying polyester materials to provide improved adhesion to various other materials. It is believed that the advantageous properties of these azidoformates are due to their similarity in chemical composition to the polyesters which they are used to modify.

The polyester materials modified in accordance with the instant invention are made from the well-known polyesters obtained by reacting glycols, such as ethylene glycol, propylene glycol, cyclohexanedimethylol, and the like with dicarboxylic acids, such as terephthalic acid, isophthalic acid, stilbene dicarboxylic acid, and the like, such as shown in U.S. Pat. Nos. 3,057,823 or 3,424,727. The polyester can be in any form, including extruded, molded, spun, cast, etc., blocks, sheets, film, fiber, yarn, cord and woven and nonwoven fabrics. Included also are polyesters which have been reinforced, such as, for example, a polyester reinforced with glass fibers. In the case of yarn, fabric or cord made from polyester fibers, combinations or blends of polyester fibers with, for example, cotton or rayon fibers can be used in this invention. Improved adhesion of polyester fibers to other materials can be obtained by the process of this invention no matter what the physical form of these fibers. However, as a practical matter the fiber to be modified generally will have been previously twisted or plied into yarn or cord or may have been woven or knit into fabrics. Various methods for the preparation of blocks, sheets film, fiber, yarn, cord, and woven and unwoven fabrics of polyesters are well known to those skilled in the art.

The modification of polyester materials by treatment with an omega-hydroxyalkyl phthalate azidoformate is accomplished by contacting the polyester with an omega-hydroxyalkyl phthalate azidoformate as, for example, by dipping, spraying, brushing, or running it over a coated roll with a solution or dispersion of the azidoformate in a suitable liquid. Examplary of suitable organic solvents for the azidoformate compounds are toluene, benzene, acetone, methylene chloride, trichloroethylene, and the like. In addition to the organic solutions above mentioned, finely divided particles of the azidoformate compounds can be dispersed in water using surface active agents. Next, the thus contacted polyester is heated to a temperature above the decomposition point of the azidoformate groups resulting in surface modification of the polyester. This temperature will vary depending upon the period of time the material is heated. Thus, a temperature of about 200°–250°F. can be used if the material is to be heated for several minutes, while a temperature of about 450°F. is required if the material is to be heated for less than a minute. In general the temperature will be from about 200°F. to about 500°F. Various amounts of the omega-hydroxyalkyl phthalate azidoformate compounds can be used. The optimum amount will depend upon the amount of modification desired and the specific azidoformate compound used. In general, the amount added based on the weight of the polyester will be from about 0.1 to about 5%.

As indicated above, the azidoformate modified polyester materials exhibit a much greater adhesion for other materials. Typical of the other materials which can be adhered to or to which the modified polyesters will adhere are other polymers such as the hydrocarbon polymers including polystyrene, styrene–butadiene rubber, butyl rubber, natural rubber, polybutadiene, polyisobutylene, cis-1,4-polyisoprene; and the non-hydrocarbon polymers including the cellulose esters such as cellulose acetate butyrate, acetate rayon; cellulose partial alkyl ethers such as hydroxyethyl and hydroxypropyl cellulose; drying and non-drying alkyd resins; poly(alkylene oxides) such as poly(propylene oxide); poly(arylene oxides) such as poly(phenylene oxide); the polyamides such as nylon, perlon-L; poly(vinyl alkyl ethers) such as poly(vinyl methyl ether); vinyl chloride polymers such as poly(vinyl chloride), vinyl chloride-vinyl acetate copolymers, vinyl chloride-vinylidene chloride copolymer, vinyl chloride-maleic anhydride copolymer, vinyl chloride-vinyl acetal copolymers, vinyl chloride-vinyl acetate-maleic anhydride terpolymer; chlorinated natural rubber; ethylene-vinyl acetate copolymers; poly(vinylidene chloride); vinylidene chloride-acrylonitrile copolymer; poly(ethyl acrylate); poly(ethyl methacrylate); epoxy resins; epoxy polymers such as poly(epichlorohydrin); poly[3,3-bis(chloromethyl)oxetane]; polychloroprene; butadiene-acrylonitrile copolymer and butadiene-acrylonitrile-styrene terpolymer; cellulosics such as wood, paper and cotton; siliceous materials such as glass, asbestos, sand, clay, concrete, stone, brick and ceramic materials; metals such as aluminum, cadmium, chromium, copper, iron, magnesium, nickel, tin, titanium and zinc, and alloys of the metals such as brass, bronze, steel and nickel chrome; and including metals and alloys which have been surface treated with phosphates, chromates, etc.; metal oxides such as aluminum oxide, iron oxide, lead oxide titanium dioxide and zinc oxide, and the conventional coating compositions such as the alkyd resin based coatings, epoxy based coatings and urethane based coatings In many cases, particularly in structural bonding, it is desirable to use adhesives and bonding cements between the modified polyester and material to which it is to be bonded. Typical of the adhesives and cements which bond tightly to the modified polyesters are the cellulosic adhesives such as cellulose acetate, cellulose nitrate and methyl cellulose; natural rubber-based adhesives; nitrile-rubber cements such as those based on acrylonitrile-butadiene copolymers; carboxylic elastomer adhesives such as those based on vinyl chloride-vinyl acetate-maleic anhydride terpolymers, ethyl acrylate-acrylonitrile-acrylic acid terpolymers or butadiene-methacrylic acid copolymers neoprene cements, both curing and non-curing; polysulfide adhesives such as the reaction products of polysulfide liquid polymer with an epoxy resin, phenol-aldehyde resin adhesives such as phenol-formaldehyde resins and resorcinol-formaldehyde resins; amino resin adhesives such as urea-formaldehyde resins and melamine-formaldehyde resins; epoxy resin adhesives such as the resin resulting from the condensation of epichlorohydrin and bis-phenol-A; isocyanate-based adhesives, vinyl polymer adhesives such as polyvinyl acetate, polyvinyl alcohol, polyvinyl butyral, polyvinyl formal, polyvinyl methyl ether, polyvinyl ethyl ether and polyvinyl isobutyl ether; cyanoacrylate adhesives such as methyl 2-cyanoacrylate; polyamide adhesives such as the thermoplastic reaction products of dibasic acids with diamines or the thermoset reaction products of polyamide resins with epoxy resins; and unsaturated polyester adhesives such as the resin resulting from the reaction of maleic anhydride and 1,2-propylene glycol.

The specific adhesive or bonding cement which may be used will depend upon the material to be bonded to the modified polyester. For example, in bonding a polyester to rubber, such as bonding fibrous polyester reinforcing material to rubber, the use of an industrial adhesive is most advantageous. The adhesive will generally be a mixture of a phenol-aldehyde resin and a vinylpyridine polymer latex. The exact selection of the polymer latex components will be made to achieve compatibility with the rubber used in the final polyester-to-rubber composite. Preferably, the phenol-aldehyde resin will be prepared from resorcinol and formaldehyde, although other phenols such as hydroxybenzene, paracresol, and pyrogallol can also be used. The mole ratio of phenolic compound to aldehyde in the phenol-aldehyde resin can be varied between about 1:1.02 to about 1:5. The phenol-aldehyde resin will generally be aged for a period of from about 0.5 to about 6 hours before mixing with a vinylpyridine polymer latex. The said aging can be carried out at room temperature or elevated temperatures. For use with natural rubber and styrene-butadiene rubber the vinylpyridine polymer latex will preferably be a terpolymer of a vinylaryl monomer, a diene monomer, and a vinylpyridine monomer. The vinylaryl monomer will preferably be styrene, although other monomers such as vinyltoluene can be used. The diene monomers which can be used in preparing the polymer latex are open-chained conjugated diolefins, including, for example, 1,3-butadiene, isoprene, 2,3-dimethyl-1,3-butadiene, 1,2-diethyl-1,3-butadiene and piperylene. The vinylpyridine monomers most useful in preparing the polymer latex are alphavinylpyridine, 5-ethyl-2-vinylpyridine, and 2-methyl-5-vinylpyridine. The vinylpyridine content of the terpolymer is usually from about 5% to about 25%. The vinylaryl monomer content is from about 5% to about 35% and the diene monomer content from about 50% to about 85%. The polymer latex can be admixed with the phenol-aldehyde resin at ratios between about 2:1 and about 10:1. Following the mixing of the two ingredients the pH will generally be adjusted to about 9.5 to about 10.5 using an inorganic base such as ammonium hydroxide.

The modified polyester material can be coated with the conventional industrial adhesive coating uniformly by dipping, spraying, running the material over a coated roll, or other conventional procedure. The adhesive coating will amount to from about 2% to about 10% by weight of the material. The adhesive coated material will then be cured for a short time such as from about 1 to about 10 minutes at a temperature between about 200°F. and about 500°F. The cured adhesive coating is a hard polymer which is very adherent to the modified polyester material and produces excellent adhesion between the modified material and conventionally vulcanized rubber. It may be desirable in certain cases to omit the latex adhesive coating thereby directly adhering the modified polyester material to a vulcanizable rubber stock and curing to obtain a bonded rubber product. Such products bonded to modified polyester material are superior to products bonded to nonmodified polyester material, but may exhibit a proportionate decrease in adhesive strength over those bonded to modified polyester material coated with the above described coating composition.

Finally, the adhesive coated modified fibrous polyester material can be bonded to a vulcanizable rubber stock by embedding the reinforcing material in the vulcanizable rubber stock and curing. Conventional vulcanization temperatures in the order from about 250°F. to about 350°F. can be used. The modified fibrous polyester material of this invention can be used reinforcement in any type of polymer material or mixtures or blends of polymer materials with suitable fillers, pigments antioxidants, and crosslinking (i.e., vulcanizing) agents such as sulfur, dicumyl peroxide, and the like. Typical of the uses of the modified fibrous polyester material is in reinforcing rubber tires, including automobile, truck, tractor, and aircraft tires, as well as in rubber belting and rubber hose where low elongation, strength and dimensional stability are important.

In the case of bonding metal to modified polyester, one can use an epoxy type such as a resin of bisphenol-A and glycidyl ether cured with a polyamide with free amino functionality. Another metal-modified polyester adhesive is a phenolic-polyvinyl butyral type adhesive. Still other adhesives for metal-modified polyester bonding will be obvious to those skilled in the art.

In the case of bonding siliceous materials such as glass to a modified polyester, one can use a polyvinyl acetal type adhesive such as a polyvinyl butyral-type adhesive. Where the glass is in the form of fibers for reinforcement of polyester material, the bond between the fibers and polyester can be improved by coating the fibers with an omega-hydroxyalkyl phthalate azidoformate before these are embedded in the polyester. After embedding the glass fibers the thus reinforced polyester can be heated to modify the polyester at the glass-polyester interface.

Still other uses of the modified polyester materials will be obvious to those skilled in the art.

The following examples will serve to illustrate the invention, all parts and percentages being by weight unless otherwise indicated.

EXAMPLE 1

This example illustrates the preparation of beta-hydroxyethyl terephthalate azidoformate.

To a solution of 15 parts of beta-hydroxyethyl terephthalate chloroformate in a mixed solvent comprising 79 parts of acetone and 133 parts of methylene chloride is added twenty parts of sodium azide at room temperature. The resulting mixture is stirred for approximately six hours and then stripped of solvent under a vacuum. The resulting product, consisting essentially of beta-hydroxyethyl terephthalate azidoformate (at least 90% pure), has a melting point of 85°– °C. An infrared spectrum of this product shows a strong azide peak at 2140 cm.$^{-1}$. A typical elemental analysis of this product is:

|     | Calculated | Found |
|-----|------------|-------|
| % C | 42.8       | 43.5  |
| % H | 3.1        | 3.4   |
| % N | 21.4       | 20.5  |

EXAMPLE 2

This example illustrates the preparation of beta-hydroxyethyl isophthalate azidoformate.

To a solution of 99 parts of beta-hydroxyethyl isophthalate chloroformate in a mixed solvent comprising 266 parts of methylene chloride and 79 parts of acetone, is added 65 parts of sodium azide. The resulting slurry is stirred for 15 hours at room temperature, filtered and the solvent removed under vacuum. The resulting product (91% of theoretical) consists essentially of beta-hydroxyethyl isophthalate azidoformate (at least 90% pure). An infrared spectrum of this product shows a strong azide peak at 2140 cm.$^{-1}$. A typical elemental analysis of the product is:

|     | Calculated | Found |
|-----|------------|-------|
| % C | 42.8       | 43.8  |
| % H | 3.1        | 3.6   |
| % N | 21.4       | 20.2  |

EXAMPLE 3

This example illustrates the preparation of beta-hydroxyethyl orthophthalate azidoformate.

Beta-hydroxyethyl orthophthalate azidoformate is prepared exactly as described in Example 2 except for the substitution of beta-hydroxyethyl orthophthalate chloroformate for the isophthalate chloroformate in the former example.

EXAMPLE 4

This example illustrates the preparation of beta-hydroxyethyl isophthalate dimer azidoformate having the following general formula:

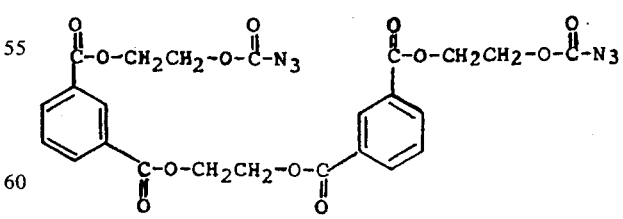

To a solution of 54 parts of beta-hydroxyethyl isophthalate dimer chloroformate in a mixed solvent of acetone and methylene chloride is added 66 parts of sodium azide at room temperature. The resulting mixture is stirred for approximately 6 hours and then stripped of solvent under a vacuum. The resulting product, consisting of more than 80% beta-hydroxyethyl isophthalate dimer azidoformate, is a clear colorless viscous oil. A typical elemental analysis of the product is:

|     | Calculated | Found |
| --- | --- | --- |
| % C | 49.4 | 49.9 |
| % H | 3.4 | 3.8 |
| % N | 14.4 | 13.8 |

EXAMPLES 5, 6, 7 & 8

These examples show the bonding of polyester tire cord to rubber tire stock using the beta-hydroxyethyl phthalate azidoformate compounds of Examples 1–3 and the beta-hydroxyethyl isophthalate dimer azidoformate of Example 4.

In each case poly(ethylene terephthalate) tire cord, 1000 denier and 3-ply under about 500 grams of tension is passed twice through a trough containing a 5% solution of the azidoformate compound in trichloroethylene. The cord is next passed through two ovens in series at 200°F. and 350°F. Residence times in the ovens are 65 and 54 seconds respectively. The cord dip pick-up is approximately 2% by weight in each case.

The modified cord is next dipped in a resin latex prepared as follows: To a solution of 0.24 part of sodium hydroxide in 192.8 parts of water is added 8.8 parts of resorcinol with continued stirring until a complete solution is achieved. Then 12.2 parts of 37% formaldehyde is added. The solution is aged for approximately 5 hours at about 75°C. and then added slowly to a mixture of 48 parts of water and 195 parts of a commercial latex comprising a 41% solids terpolymer of styrene, butadiene and vinylpyridine, the monomers being present in a ratio of approximately 15:70:15. The mixture is stirred slowly for 15 minutes and its pH adjusted to 10.3 using concentrated ammonium hydroxide. The resulting gray-violet latex contains approximately 20% solids. The azidoformate modified cord is passed twice through a trough of the above-described tire cord coating under a tension of 500 grams and then dried and cured for 54 seconds at a temperature of 430°F. The cord dip pick-up is approximately 4.5% by weight in each case.

The thus coated cord is then embedded in a vulcanizable rubber tire stock and cured in the form of 3/8 inch H-specimens. The rubber tire stock has the following formulation:

| Compounds | Parts |
| --- | --- |
| Natural rubber (smoked sheet) | 80 |
| Styrene-butadiene rubber | 20 |
| Semi-reinforcing furnace black | 25 |
| Zinc Oxide | 5 |
| Stearic Acid | 2 |
| Polytrimethyldihydroquinoline | 1 |
| Heavy Pine Tar | 0.5 |
| Benzothiazole Disulfide | 1 |
| Tetramethyl Thiuram Disulfide | 0.1 |
| Sulfur | 2.6 |

The test specimens are cured for 45 minutes at a temperature of 307°F. After several hours conditioning at room temperature the H-specimens are tested according to the procedure of ASTM D-2138-62T. A control specimen treated exactly the same as described above is also tested. The results of the test are tabulated below:

| Example | Azidoformate Treatment | Pounds to Failure (Average of Six Tests) |
| --- | --- | --- |
| Control | None | 12.6 |
| 5 | Beta-Hydroxyethyl terephthalate azidoformate | 47.0 |
| 6 | Beta-Hydroxyethyl iso-phthalate azidoformate | 46.0 |
| 7 | Beta-Hydroxyethyl ortho-phthalate azidoformate | 43.0 |
| 8 | Beta-Hydroxyethyl isophthalate Dimer azidoformate | 45.0 |

EXAMPLE 9

This example shows the bonding of polyester tire cord to rubber tire stock using an aqueous emulsion of beta-hydroxyethyl isophthalate azidoformate.

A 20% emulsion is formd by heating 200 parts of beta-hydroxyethyl isophthalate azidoformate to 80°C. at which temperature it is quite liquid, and adding with stirring approximately 400 parts of water heated to 90°C. and containing 10 parts of sodium lauryl sulfate surface active agent. An addititional 400 parts of hot water is added and the mixture homogenized.

Poly(ethylene terephthalate) tire cord, 1000 denier and 3 ply is modified using the azidoformate emulsion, heated, coated with a resin latex, embedded in a vulcanizable rubber tire stock and cured in the form of 1/4 inch H-specimens all as described in Examples 5 to 8. The test specimens are tested according to the procedure of ASTM D-2138-62T. An average (6-test specimens) of 30.2 pounds is required to overcome the tire cord-rubber adhesion. Control specimens treated exactly the same way except for the azidoformate compound treatment give an average of 12.6 pounds to overcome the tire cord-rubber adhesion.

EXAMPLE 10

This example shows the surface modification of polyester plaques and their bonding with an epoxy adhesive.

Injection molded glass reinforced poly(ethylene terephthalate) plaques, about 4 × 4 inches by 1/8 inch thick and containing approximately 30% by weight of glass reinforcing fibers are sprayed with a 10% solution of beta-hydroxyethyl isophthalate azidoformate in toluene. The solvent is evaporated off and the coated plaques heated for 4 minutes at a temperature of 180°C. A light yellow tack-free coating results which adheres tenaciously to the plaque suface. The add-on of the azidoformate primer is approximately 1 mg. per sq. inch.

The thus modified plaques are coated with a liquid epoxy adhesive of the bisphenol A-glycidyl ether type, having an epoxy equivalent of about 180–185 and containing approximately 10 parts per hundered of triethylene tetramine. The adhesive coated surfaces of the plaques are pressed together, with a one inch overlap, using approximately 50 lbs. pressure and cured for 30 minutes at a temperature of 140°C. The adhesive layer between the plaques is approximately 1 mil in thickness. A control laminate is prepared in an identical way except the azidoformate priming step is omitted.

Lap shear tests according to ASTM D1002 are performed on 1 inch wide samples of the modified plaque laminate and control. The azidoformate primed laminate fails at approximately 700 lbs./sq. in. due to the breaking of the plaque along the bond edge. The control fails at approximately 170 lbs./sq. in. with adhesion failure at the interface.

of the thus modified film are bonded to modified glass reinforced plaques, prepared as described in Example 10, by coating the modified surface of each film and plaque with an adhesive as described below. Controls are prepared using unmodified glass reinforced plaques. Specimens of the laminates are tested for 180° peel strength and the results tabulated below:

Table I

| Adhesive | Adhesive Cure | Modified Film and Modified Plaques | Modified Film and Unmodified Plaques |
|---|---|---|---|
| Epoxy Adhesive[1] | 140°C. for 30 minutes | Film failed before joint | Adhesive failure at interface |
| Polyester Adhesive[2] | 130°C. for 30 minutes | Film failed before joint | Adhesive failure at interface |
| Polyester Adhesive[3] | 130°C. for 30 minutes | Film failed before joint | Adhesive failure at interface |
| Polyester Adhesive[4] | 130°C. for 30 minutes | Film failed before joint | Adhesive failure at interface |
| Rubber-based Adhesive[5] | Room temp. | Cohesive failure of adhesive | Adhesive failure at interface |

[1]Bisphenol A-glycidyl ether type described in Example 11.
[2]Saturated polyester type sold under the name "Vitel PE 207", modified with polyisocyanate cross-linker.
[3]Saturated polyester type sold under the name "DuPont polyester 49,650", modified with polyisocyanate cross-linker.
[4]Saturated polyester type sold under the name "Bostik 7902", modified with polyisocyanate cross-linker.
[5]Rubber-based cement sold under the name "Conbond".

EXAMPLE 11

This example shows the bonding of polyester plaques to cold-rolled steel.

An injection molded glass reinforced poly(ethylene terephthalate) plaque as described in Example 10 is modified with beta-hydroxyethyl isophthalate azidoformate exactly as described in Example 10. The thus modified plaque and a 4 × 4 inch sheet of cold-rolled steel 0.063 inch thick, which had been cleaned and degreased in trichloroethylene, are coated with a liquid epoxy adhesive of the bisphenol A-glycidyl ether type, having an epoxy equivalent of about 180-184 and containing approximately equal parts by weight of a polyamide with free amino functionality. The adhesive coated surface of the plaque is pressed against the adhesive coated surface of the steel sheet, with a one inch overlap, using approximately 50 lbs. pressure and cured for 30 minutes at a temperature of 140°C. The adhesive layer is about 1 mil in thickness. The strength of the bond as determined in lap shear tests according to ASTM D1002 is greater than 1150 lbs./sq. in.

EXAMPLE 12

This example shows the use of various adhesives in bonding modified polyester materials.

Poly(ethylene terephthalate) film 5 mils thick is coated and modified with beta-hydroxyethyl isophthalate azidoformate as described in Example 10. Samples

What I claim and desire to protect by Letters Patent is:

1. A priming composition comprising (1) an omega-hydroxyalkyl phthalate azidoformate having the general formula

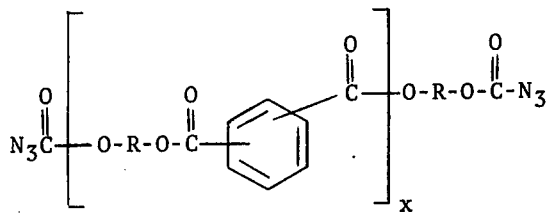

where R is an alkylene radical containing 2 to 10 carbon atoms and $x$ is an integer from 1 to 10 and (2) a liquid medium.

2. The composition of claim 1 where the liquid medium is an organic solvent.

* * * * *

UNITED STATES PATENT AND TRADEMARK OFFICE
CERTIFICATE OF CORRECTION

PATENT NO. : 3,946,051
DATED : March 23, 1976
INVENTOR(S) : James N. Haynes

It is certified that error appears in the above-identified patent and that said Letters Patent are hereby corrected as shown below:

Col. 2, line 7
 "reduced" -- should read -- "related"

Col. 7, Line 40
 "butyral-type" -- should read -- "butyral-phenol type"

Col. 7, line 69
 "85° - °C" -- should read -- "85° - 87°C"

Col. 11, Line 43
 "184" -- should read -- "185"

Signed and Sealed this first Day of June 1976

[SEAL]

Attest:

RUTH C. MASON
Attesting Officer

C. MARSHALL DANN
Commissioner of Patents and Trademarks